US011928283B2

(12) United States Patent
Miyazawa et al.

(10) Patent No.: US 11,928,283 B2
(45) Date of Patent: Mar. 12, 2024

(54) DISPLAY DEVICE AND METHOD TO OVERDRIVE A DISPLAY SIGNAL BASED ON TOUCH INFORMATION

(71) Applicant: Sharp Display Technology Corporation, Kameyama (JP)

(72) Inventors: Jin Miyazawa, Kameyama (JP); Noriyuki Tanaka, Kameyama (JP); Daiji Kitagawa, Kameyama (JP); Tatsuhiko Suyama, Kameyama (JP); Yousuke Nakamura, Kameyama (JP); Daisuke Suehiro, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/095,241

(22) Filed: Jan. 10, 2023

(65) Prior Publication Data

US 2023/0273697 A1    Aug. 31, 2023

(30) Foreign Application Priority Data

Feb. 28, 2022  (JP) .................................. 2022-029395

(51) Int. Cl.
*G06F 3/041*    (2006.01)
*G06F 3/044*    (2006.01)

(52) U.S. Cl.
CPC .......... *G06F 3/04166* (2019.05); *G06F 3/044* (2013.01)

(58) Field of Classification Search
CPC ... G06F 3/04166; G06F 3/044; G09G 3/3648; G09G 3/3696; G09G 2320/0242; G09G 2320/0252; G09G 2320/0261
See application file for complete search history.

(56) References Cited

U.S. PATENT DOCUMENTS

| 2002/0015024 A1* | 2/2002 | Westerman ........... G06F 3/0446 |
| | | 345/173 |
| 2005/0140634 A1 | 6/2005 | Takatori |
| 2006/0145978 A1 | 7/2006 | Takatori et al. |
| 2010/0007637 A1 | 1/2010 | Takatori |
| 2010/0171818 A1 | 7/2010 | Takatori |
| 2010/0321376 A1 | 12/2010 | Takatori |
| 2015/0035737 A1 | 2/2015 | Takatori et al. |
| 2019/0122636 A1* | 4/2019 | Tang ......................... G09G 5/10 |
| 2020/0326800 A1* | 10/2020 | Son ......................... G06F 3/047 |

FOREIGN PATENT DOCUMENTS

JP        2005-208600 A      8/2005

* cited by examiner

*Primary Examiner* — Liliana Cerullo
(74) *Attorney, Agent, or Firm* — ScienBiziP, P.C.

(57) ABSTRACT

A display device includes: a display panel including a sensor unit configured to detect a touch operation; a first control unit configured to supply a first signal to the display panel; and a second control unit configured to calculate touch information related to the touch operation and to supply the touch information to the first control unit. The first control unit includes: a signal generator configured to generate the first signal based on an image signal supplied from an external image signal supply source; and an overdrive circuit configured to perform a process of increasing an amplitude of the first signal generated by the signal generator. The overdrive circuit is actuated based on the touch information from the second control unit. The first control unit, in response to the actuation of the overdrive circuit, supplies the first signal having the amplitude increased by the overdrive circuit to the display panel.

10 Claims, 10 Drawing Sheets

DISPLAY DEVICE AND METHOD TO OVERDRIVE A DISPLAY SIGNAL BASED ON TOUCH INFORMATION

CROSS-REFERENCE TO RELATED APPLICATION

The present application claims priority from Japanese Application JP2022-029395, the content of which is hereby incorporated by reference into this application.

BACKGROUND

1. Field

The subject technology relates to a display device and a method of driving a display device.

2. Description of the Related Art

Overdriving has been known as a technique to improve the response speed of liquid crystal display devices. Japanese Unexamined Patent Application Publication, Tokukai, No. 2005-208600 describes one of such examples. Japanese Unexamined Patent Application Publication, Tokukai, No. 2005-208600 discloses overdriving of temporarily increasing the voltage applied across the liquid crystal layer over typical values to increase the electric field strength, thereby promoting a change in state of the liquid crystal layer.

SUMMARY

Overdriving, being capable of improving response speed, can smooth out screen transitions invoked by, for example, scrolling when applied to, for example, a model with a touch panel function where an input can be made by a touch operation of touching the display screen. However, overdriving requires an increased voltage to be applied across the liquid crystal layer, inevitably increasing power consumption. It is therefore difficult to achieve both display quality improvement and low power consumption.

The subject technology has been completed in view of these problems and has an object to provide a display device with a touch panel function capable of restraining increases in power consumption and at the same time improving display quality.

(1) A display device in accordance with the subject technology includes: a display panel including: a display screen on which an image is displayed; and a sensor unit configured to detect a touch operation on the display screen; a first control unit configured to supply a first signal to the display panel to display the image; and a second control unit configured to calculate touch information related to the touch operation based on a sensor signal from the sensor unit and to supply the touch information to the first control unit, wherein the first control unit includes: a signal generator configured to generate the first signal based on an image signal supplied from an external image signal supply source; and an overdrive circuit configured to perform a process of increasing an amplitude of the first signal generated by the signal generator, the overdrive circuit is actuated based on the touch information from the second control unit, and the first control unit, in response to the actuation of the overdrive circuit, supplies the first signal having the amplitude increased by the overdrive circuit to the display panel.

(2) The display device, in addition to (1) above, may be such that the first control unit determines, based on the touch information from the second control unit, whether or not a touch operation is being performed, and the overdrive circuit is actuated in response to a determination that a touch operation is being performed.

(3) The display device, in addition to (2) above, may be such that the overdrive circuit remains actuated from the determination that a touch operation is being performed until a determination that no touch operation is being performed.

(4) The display device, in addition to (3) above, may be such that the overdrive circuit remains actuated for a prescribed time after the determination that no touch operation is being performed.

(5) The display device, in addition to (1) above, may be such that the first control unit determines, based on the touch information from the second control unit, whether or not a touch operation is being performed, and the overdrive circuit is actuated in response to a determination that a touch operation involving an acceleration greater than or equal to a threshold value is being performed.

(6) The display device, in addition to any one of (1) to (5) above, may be such that the signal generator generates the first signal as discretized gray level values, and the overdrive circuit performs a process of increasing the gray level values.

(7) The display device, in addition to any one of (1) to (6) above, may be such that the sensor unit is a sensor electrode configured to detect the sensor signal by an electrostatic capacity scheme.

(8) The display device, in addition to any one of (1) to (7) above, may be such that the display panel is a liquid crystal panel including a liquid crystal layer containing liquid crystal molecules that change alignment.

(9) A method of driving a display device in accordance with the subject technology is a method of driving a display device including a display panel having a touch panel function, the method including: generating, based on an image signal supplied from an external image signal supply source, a first signal to display an image; calculating touch information related to a touch operation based on a sensor signal supplied from a sensor unit that detects the touch operation on a display screen; determining, based on the touch information, whether or not a touch operation is being performed; and in response to a determination that a touch operation is being performed, actuating an overdrive circuit that performs a process of increasing an amplitude of the first signal and supplying the first signal having the amplitude increased by the overdrive circuit to the display panel.

(10) The method of driving a display device, in addition to (9) above, may be such that the overdrive circuit remains actuated from the determination that a touch operation is being performed until a determination that no touch operation is being performed

(11) The method of driving a display device, in addition to (10) above, may be such that the overdrive circuit remains actuated for a prescribed time after the determination that no touch operation is being performed.

(12) The method of driving a display device, in addition to (9) above, may be such that the overdrive circuit is actuated in response to a determination that a touch operation involving an acceleration greater than or equal to a threshold value is being performed.

(13) The method of driving a display device, in addition to any one of (9) to (12) above, may be such that the method includes generating the first signal as discretized gray level values, and the overdrive circuit performs a process of increasing the gray level values.

(14) The method of driving a display device, in addition to any one of (9) to (13) above, may be such that the sensor unit is a sensor electrode that detects the sensor signal by an electrostatic capacity scheme.

(15) The method of driving a display device, in addition to any one of (9) to (14) above, may be such that the display panel is a liquid crystal panel including a liquid crystal layer containing liquid crystal molecules that change alignment.

Advantageous Effects of the Disclosure

The subject technology can provide a display device with a touch panel function capable of restraining increases in power consumption and at the same time improving display quality.

DESCRIPTION OF EMBODIMENTS

Embodiment 1

A description is given of a liquid crystal display device 100 (an example of a display device) in accordance with Embodiment 1 with reference to FIGS. 1 to 8B. Note that some of the drawings show X-, Y-, and Z-axes each indicating the same direction across all those drawings. It should be understood that these directions are for convenience only and should not be construed in any restrictive manner.

Figure 1:
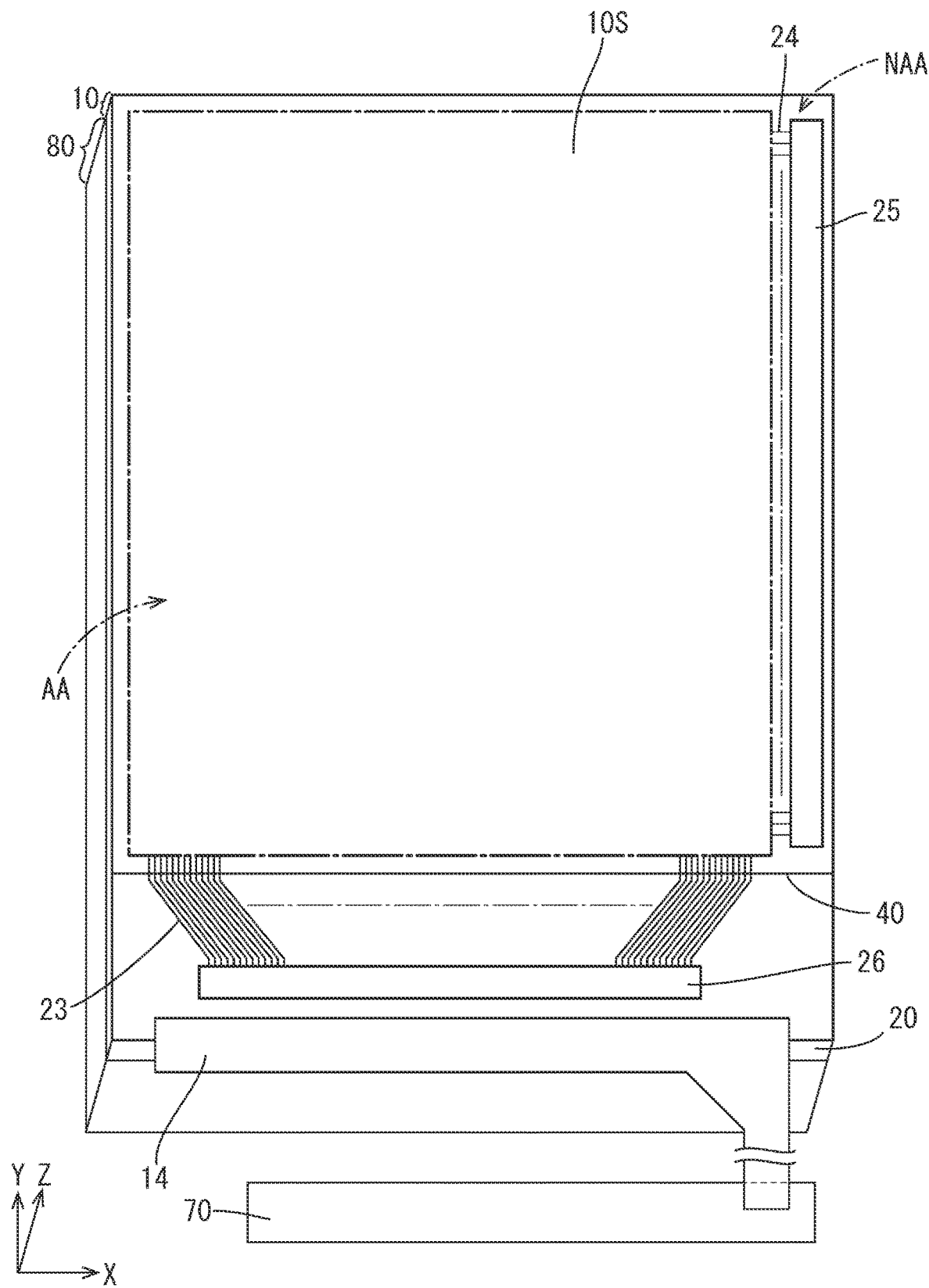
FIG. 1 is a schematic view of a liquid crystal display device in accordance with an embodiment.

The liquid crystal display device 100, as shown in FIG. 1, includes: a liquid crystal panel 10 (an example of a display panel) capable of displaying an image on a display screen 10S; and a backlight device 80 (an example of a lighting device), provided on the rear of the liquid crystal panel 10 (opposite the display screen 10S), for shining light onto the liquid crystal panel 10. The liquid crystal panel 10 is connected via a flexible substrate 14 (flexible wiring board) to a control board 70 for supplying, for example, signals needed for image displays.

The liquid crystal panel 10, as shown in FIG. 1, has a surface divided into a centrally located display area (active area) AA capable of image displays and a non-display area (non-active area) NAA shaped like a frame in a plan view and located along the periphery of the display area AA so as to surround the display area AA. In FIG. 1, a dash-dot line represents the profile of the display area AA, and the area outside this dash-dot line is the non-display area NAA. The liquid crystal panel 10, in the present embodiment, is shaped generally like a portrait-oriented rectangle and has a short-side direction thereof aligned with the X-axis direction in each drawing, a long-side direction thereof aligned with the Y-axis direction in each drawing, and a thickness direction thereof aligned with the Z-axis direction (the positive Z-axis direction is the front, and the negative Z-axis direction is the rear). The liquid crystal panel 10 may however have any shape and size.

Figure 2:
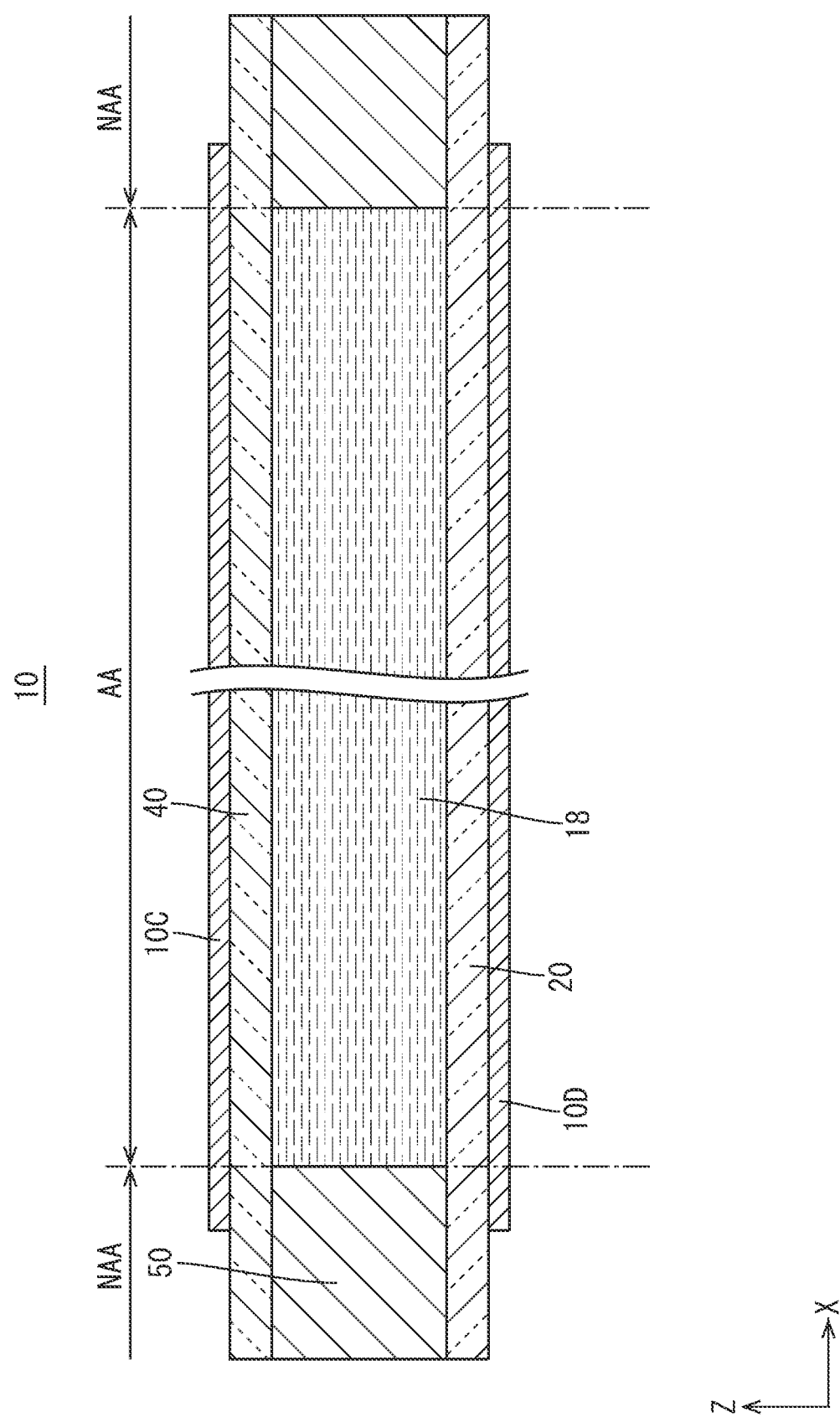
FIG. 2 is a cross-sectional view of a liquid crystal panel.

The liquid crystal panel 10, as shown in FIG. 2, includes: two substrates 20, 40 facing each other across a gap; a liquid crystal layer 18; and a sealing section 50. The liquid crystal layer 18 is sandwiched between the two substrates 20, 40 and contains liquid crystal molecules, a material that changes the optical properties thereof under an electric field. The sealing section 50 is provided in the non-display area NAA so as to surround the liquid crystal layer 18 and intervenes between the two substrates 20, 40, thereby maintaining as large a cell gap as the thickness of the liquid crystal layer 18 and sealing the liquid crystal layer 18. Of the substrates 20, 40, the front-side substrate (positioned closer to the display screen 10S) is a CF substrate 40 (color filter substrate, opposite substrate), and the rear-side substrate (positioned closer to the backlight device 80) is an array substrate 20 (active matrix substrate, TFT substrate). On the outer sides of the two substrates 20, 40 (opposite the liquid crystal layer 18) are there attached the polarizers 10C, 10D respectively. The display screen 10S may be either the surface of the polarizer 10C or the surface of, for example, a protective member (e.g., cover glass) on the polarizer 10C. The display screen 10S needs only to be the surface of a member that is positioned on the outermost surface of all the members constituting the liquid crystal panel 10. Note that in the drawings except FIG. 2, the polarizers 10C, 10D are not shown to illustrate the other members in an easy-to-understand manner.

Figure 3:
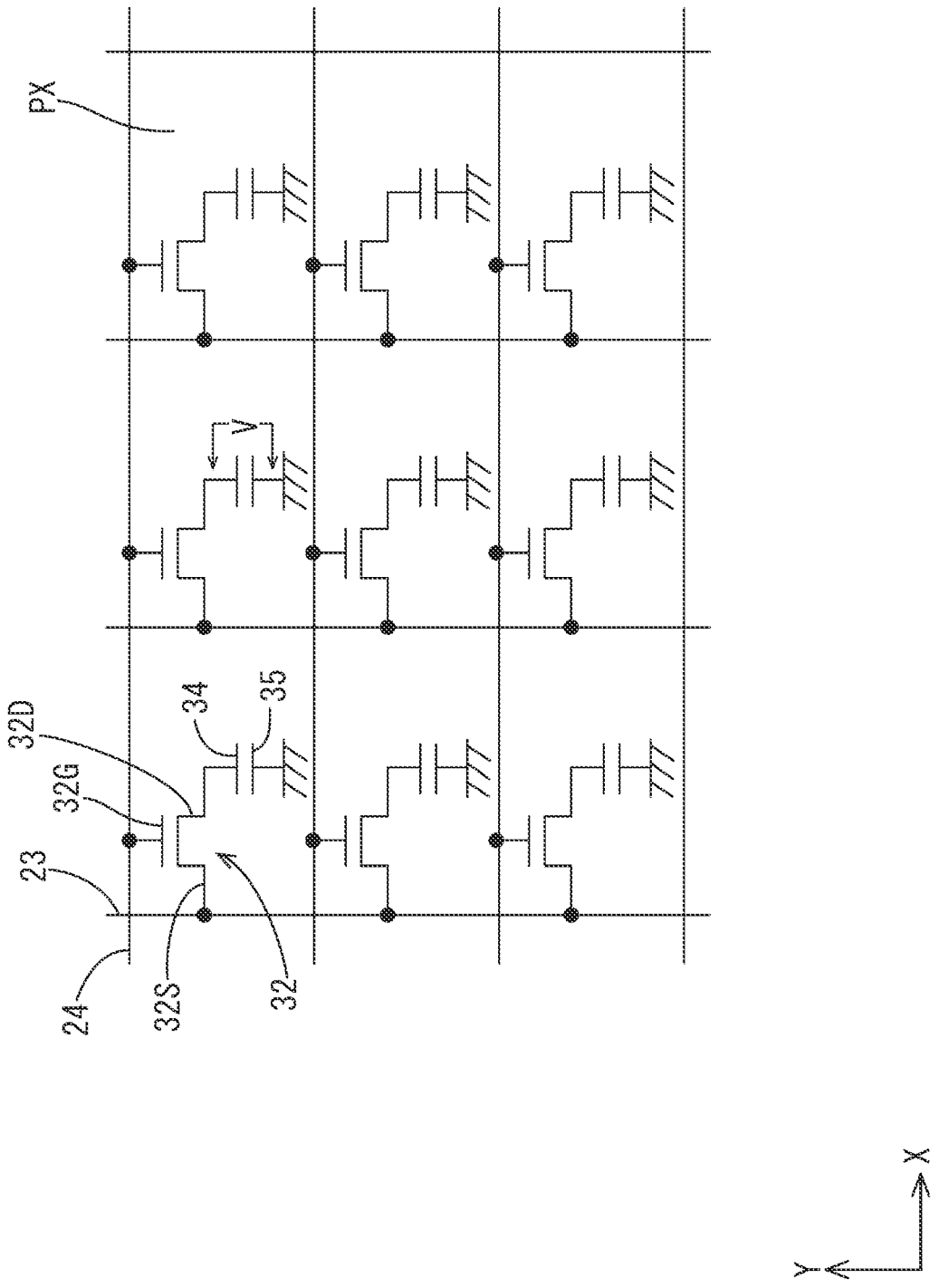
FIG. 3 is an equivalent circuit diagram of pixels.

In the display area AA of either one or both of the two substrates 20, 40 are there provided a plurality of source lines (data lines, signal lines) 23, a plurality of gate lines (scan lines) 24, a plurality of TFTs (thin film transistors) 32 which are switching elements, a plurality of pixel electrodes 34, and a common electrode 35, as shown in FIGS. 1 and 3. The source lines 23 and the gate lines 24 are provided in large numbers in a lattice form so as to intersect with each other. The TFTs 32 are provided near the intersections of the source lines 23 and the gate lines 24. The pixel electrodes 34 are provided in regions surrounded by the source lines 23 and the gate lines 24. The pixel electrodes 34 are provided in large numbers in a matrix form and connected to the respective TFTs 32. The pixel electrodes 34 and the TFTs 32 form pixels (picture elements) PX each of which is the smallest unit of a displayed image in the liquid crystal panel 10. The common electrode 35 is formed to receive the application of a reference potential COM.

The gate lines 24 are, as shown in FIG. 1, connected to a gate driver 25 located on a longer side of the non-display area NAA. The source lines 23 are connected to a source driver 26 located on a shorter side of the non-display area NAA. The gate driver 25 and the source driver 26 are connected to a TCON 71 (timing controller; example of a first control unit; described later in detail) on the control board 70.

Gate signals are fed from the gate driver 25 to gate electrodes 32G of the TFTs 32 via the gate lines 24. Data signals (source signals) are fed from the source driver 26 to source electrodes 32S of the TFTs 32 via the source lines 23. As a gate signal and a data signal are fed to the TFT 32, and the gate signal increases to, or in excess of, the gate threshold voltage of the TFT 32, a current flows between the source electrode 32S and a drain electrode 32D of the TFT 32, thereby charging the pixel electrode 34. Hence, the electrical potential of the pixel electrode 34 assumes a value corresponding to the data signal. Then, as the voltage (electric field) applied across the liquid crystal layer 18 is changed by a voltage V produced between the pixel electrode 34 and the common electrode 35, the alignment of the liquid crystal molecules changes.

By changing the electrical potential of the pixel electrode 34 in this manner, thereby controlling the electric field across the liquid crystal layer 18, and switching the alignment of the liquid crystal molecules in a suitable manner, the optical transmittance of the liquid crystal panel 10 is changed for each pixel PX. Note that there are multiple driving schemes known for the liquid crystal panel 10, including FFS (fringe field switching) mode and VA (vertical alignment) mode, which differ depending on the direction of the electric field across the liquid crystal layer 18. Any display drive mode may be used. In addition, each pixel PX may include, for example, an auxiliary capacitor for retaining the electrical potential to which the pixel electrode 34 is charged.

Figure 4:
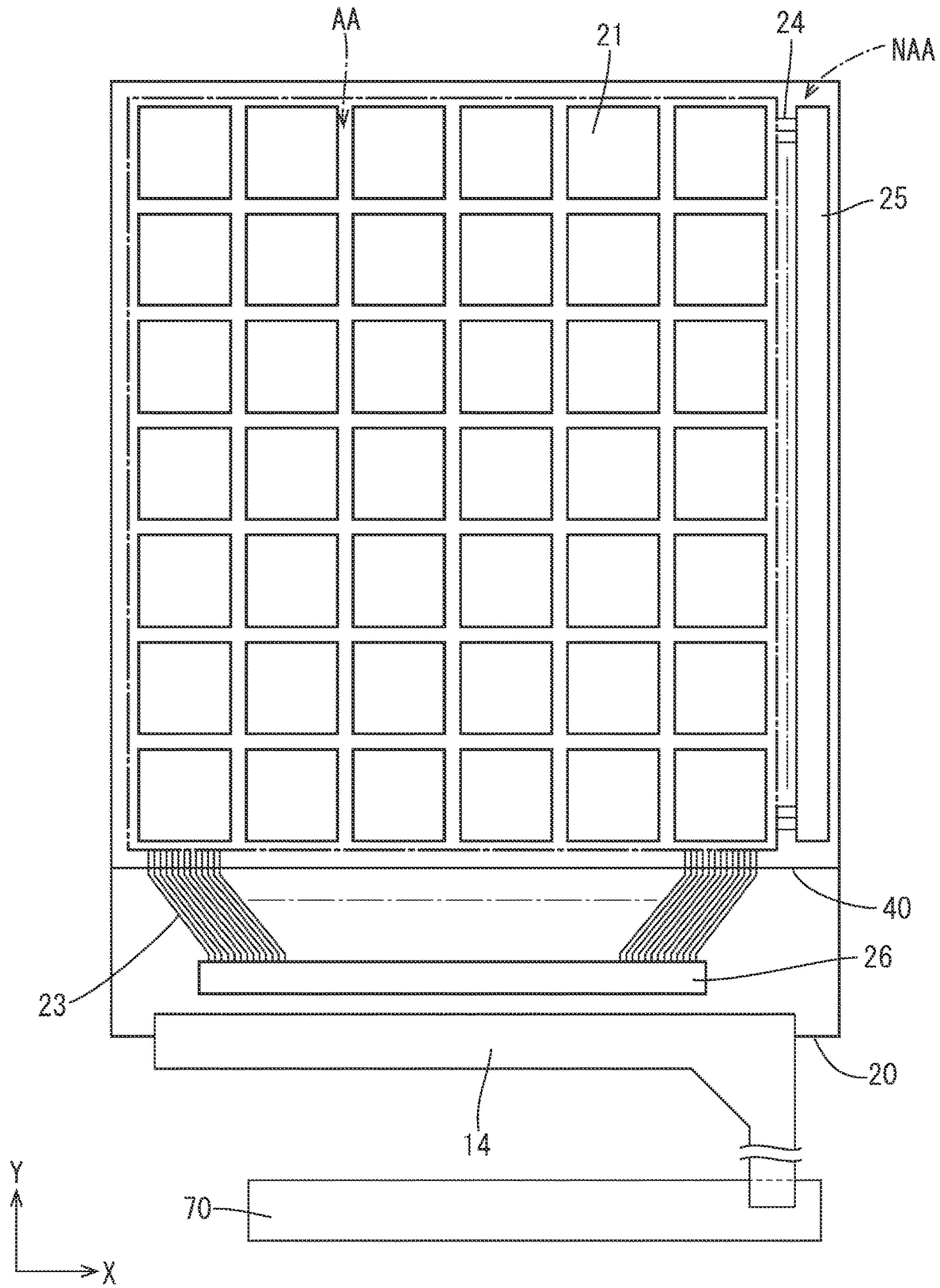
FIG. 4 is a plan view of a plurality of sensor electrodes in the liquid crystal panel.

The liquid crystal panel 10 has a touch panel function enabling inputs through a touch operation. The liquid crystal panel 10, as shown in FIG. 4, further includes a plurality of sensor electrodes 21 (an example of a sensor unit) for detecting a touch operation on the display screen 10S. The sensor electrodes 21 are made of a transparent electrode material and transmit light, hence not obstructing the image generated by the liquid crystal panel 10. The sensor electrodes 21 may be built in the substrates 20, 40 (in-cell structure) or attached to the substrates 20, 40 (out-cell structure). The sensor electrodes 21 are connected to a TP (touch panel) controller 73 (an example of a second control unit; described later in detail) on the control board 70 via sensor wires. The sensor electrodes 21 are arranged at prescribed intervals both in the X- and Y-axis directions to form a matrix. Each sensor electrode 21 is rectangular in the present embodiment as shown in FIG. 4 and may alternatively have any non-rectangular shape provided that the sensor electrodes 21 can form a matrix.

In response to a touch operation by the user on the display screen 10S, an electrostatic capacity is formed between a finger, which is a conductor, (or an electrically conductive input tool) and the sensor electrodes 21. The electrostatic capacity as detected near the finger by the sensor electrodes 21 hence changes, so that the TP controller 73 can calculate an input location and whether a touch operation is being performed, on the basis of this change in the electrostatic capacity. In addition, the TP controller 73 is capable of calculating whether or not the touch operation has involved an acceleration greater than or equal to a prescribed threshold value. In this manner, the TP controller 73 is capable of calculating various touch operations including a swipe (the display screen 10S is touched with a finger, and the finger is then slid on the display screen 10S), a flick (the display screen 10S is touched with a finger, and the finger is then quickly flipped on the display screen 10S), a tap (the display screen 10S is tapped with a finger), and a text input.

Figure 5:
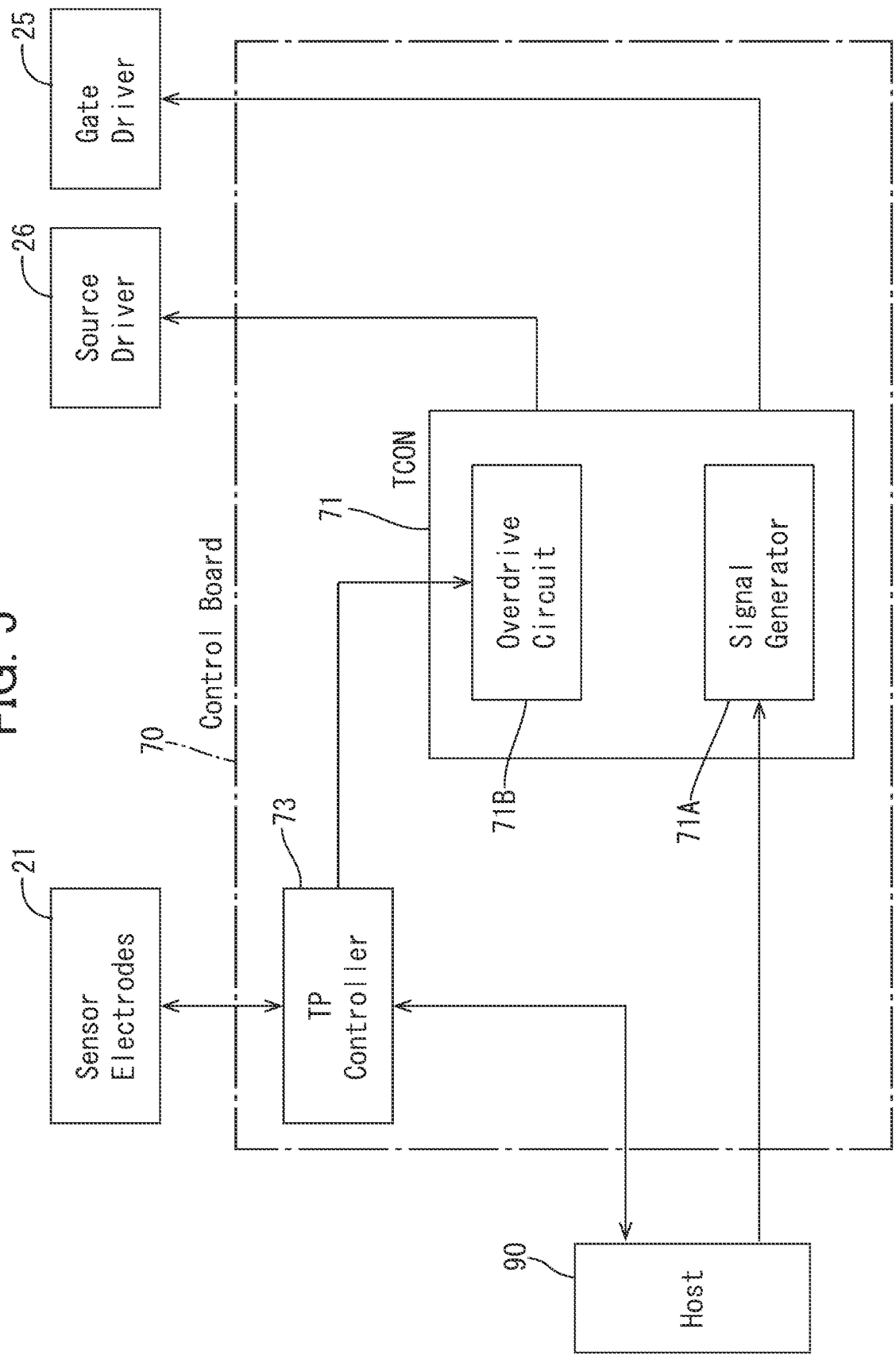
FIG. 5 is a block diagram related to the control of the liquid crystal panel.
Figure 6:
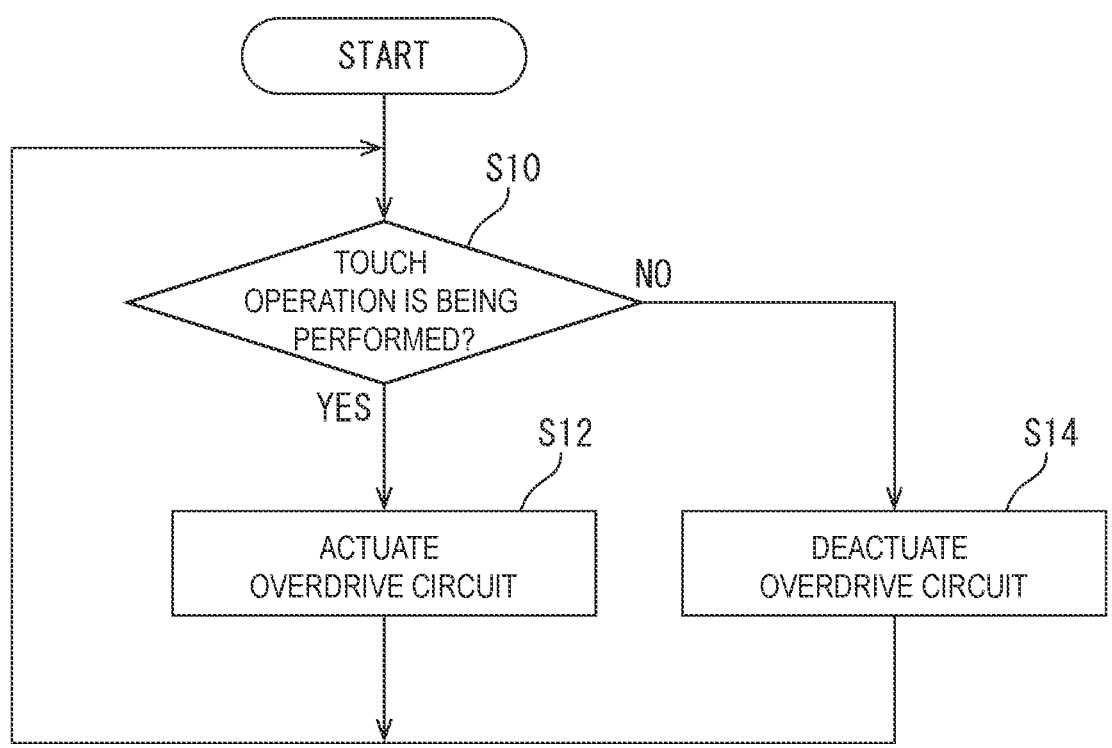
FIG. 6 is a flow chart representing control of an operation of an overdrive circuit.

The control board 70, as shown in FIG. 5, has the TCON 71 and the TP controller 73 mounted thereon. The TP controller 73 is an integrated circuit connected to the sensor electrodes 21 to receive sensor signals detected by the sensor electrodes 21 and calculate information related to a touch operation such as an input location (hereinafter, "touch information") on the basis of the sensor signal. The TP controller 73 is connected to the TCON 71 to supply touch information to the TCON 71.

The TCON 71 is a system LSI chip for supplying a signal (first signal) for displaying an image to the gate driver 25 and the source driver 26. The TCON 71 is connected to a host 90 (external image signal supply source) and includes a built-in signal generator 71A and a built-in overdrive circuit 71B. The signal generator 71A generates a signal for displaying an image for each display frame on the basis of an image signal supplied from the host 90. More particularly, the signal generator 71A discretizes the image signal supplied from the host 90 using a prescribed threshold value to generate a signal in the form of gray level values for each display frame. The overdrive circuit 71B performs an overdriving process of temporarily (only for prescribed time $T_{ON}$ during a rise) increasing the magnitude of each gray level value generated by the signal generator 71A in the display frame.

Figure 7A:
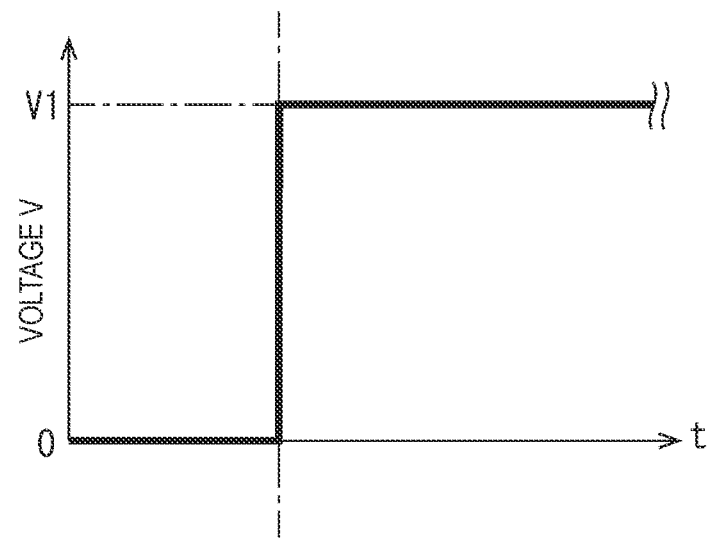
FIG. 7A is a waveform diagram of a voltage applied across a liquid crystal layer when the overdrive circuit is deactuated.
Figure 7B:
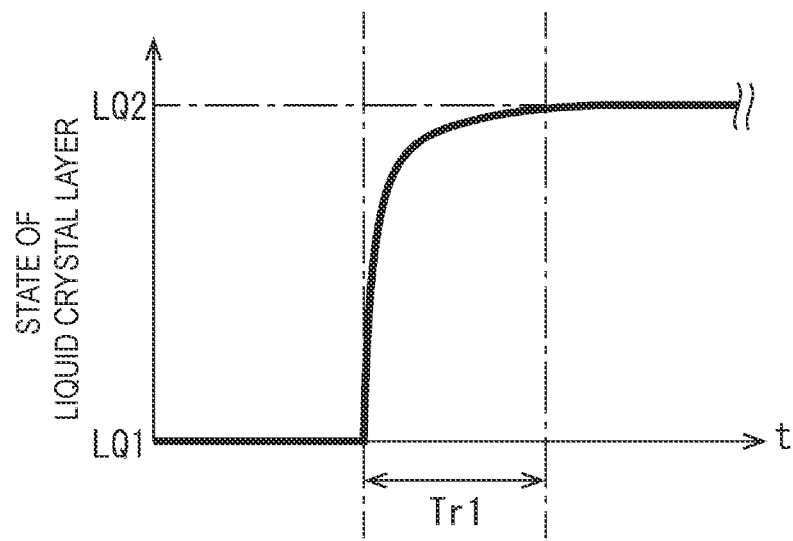
FIG. 7B is a diagram showing a change in state of the liquid crystal layer caused by the application of the voltage shown in FIG. 7A.

The overdrive circuit 71B, as shown in FIG. 5, operates on the basis of the touch information from the TP controller 73. As shown in the flow chart in FIG. 6, if the touch information from the TP controller 73 indicates that no touch operation is being performed (NO in S10), the overdrive circuit 71B is not actuated (S14). The TCON 71 hence feeds the signal generated by the signal generator 71A to the source driver 26 without overdriving. A data signal is then fed from the source driver 26 to the TFT 32 to generate, between the pixel electrode 34 and the common electrode 35, the voltage V applied across the liquid crystal layer 18. The voltage V applied across the liquid crystal layer 18, as shown in FIG. 7A, is equal to voltage V1 which corresponds to the gray level value generated by the signal generator 71A. The application of voltage V1 causes switching of the alignment of the liquid crystal molecules in the liquid crystal layer 18, thereby changing the liquid crystal layer 18 from state LQ1 to state LQ2 as shown in FIG. 7B. This change in state of the liquid crystal layer 18 changes the light-blocking ratio of the liquid crystal panel 10, causing a transition of the display screen. The screen transition of the liquid crystal panel 10 takes time that corresponds to response time Tr1 taken by the liquid crystal layer 18 to change from state LQ1 to state LQ2.

Figure 8A:
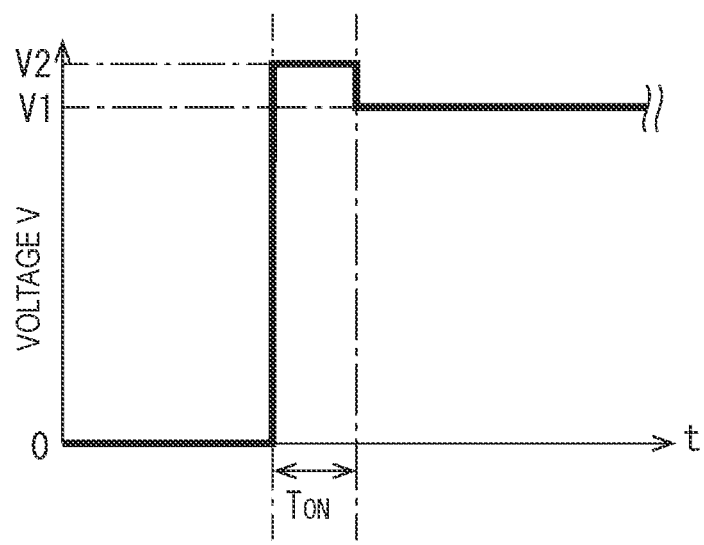
FIG. 8A is a waveform diagram of a voltage applied across the liquid crystal layer when the overdrive circuit is actuated.
Figure 8B:
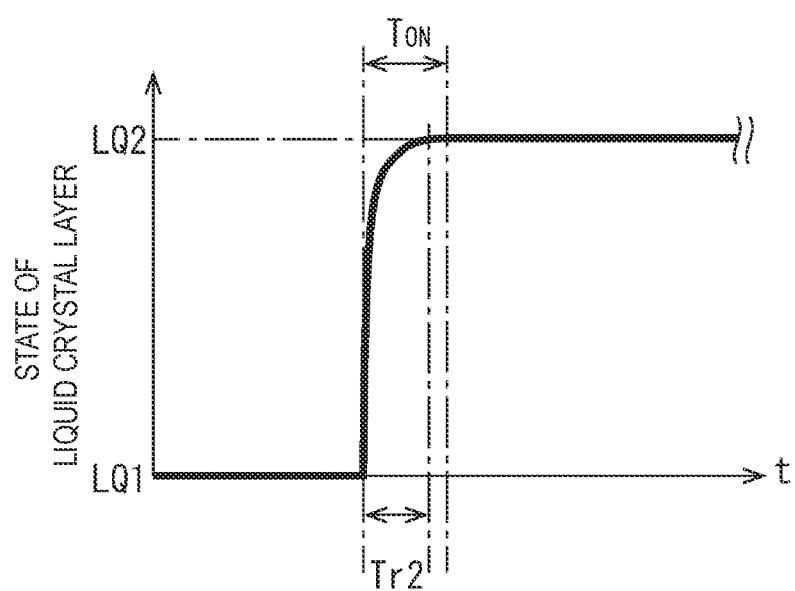
FIG. 8B is a diagram showing a change in state of the liquid crystal layer caused by the application of the voltage shown in FIG. 7B.

On the other hand, if the touch information from the TP controller 73 indicates that a touch operation is being performed (YES in S10), the overdrive circuit 71B is actuated (S12). The actuated overdrive circuit 71B performs overdriving on the signal generated by the signal generator 71A, and the TCON 71 feeds the overdriven signal to the source driver 26. A data signal is then fed from the source driver 26 to the TFT 32 to generate, between the pixel electrode 34 and the common electrode 35, the voltage V applied across the liquid crystal layer 18. For the voltage V applied across the liquid crystal layer 18, as shown in FIG. 8A, voltage V1 which corresponds to the gray level value generated by the signal generator 71A is temporarily (only for time $T_{ON}$) increased to voltage V2 by the overdriving. The application of that voltage V2 facilitates the switching of the alignment of the liquid crystal molecules in the liquid crystal layer 18. Therefore, as shown in FIG. 8B, response time Tr2 taken by the liquid crystal layer 18 to change from state LQ1 to state LQ2 is shorter than response time Tr1 described above with reference to FIG. 7B. Accordingly, the light-blocking ratio of the liquid crystal panel 10 can change rapidly, which smooths out the screen transition. Note that time $T_{ON}$ for which the voltage V applied across the liquid crystal layer 18 is increased to voltage V2 by the overdriving in the display frame is set shorter than non-overdriven response time Tr1 (FIG. 7B) of the liquid crystal layer 18.

As described above, if the operation of the overdrive circuit 71B is controlled on the basis of the touch information from the TP controller 73, scrolling and other screen transitions invoked by a touch operation can be rapidly and smoothly performed, which improves display quality. On the other hand, since the overdrive circuit 71B is not actuated if no touch operation is being performed, display quality is improved, and at the same time increases in power consumption caused by the actuation of the overdrive circuit 71B is restrained. In other words, by switching the overdrive circuit 71B between actuation and non-actuation (deactuation) on the basis of the touch information from the TP controller 73, the resultant liquid crystal display device 100 with a touch panel function is capable of restraining increases in power consumption and still improving display quality.

Embodiment 2

Figure 9:
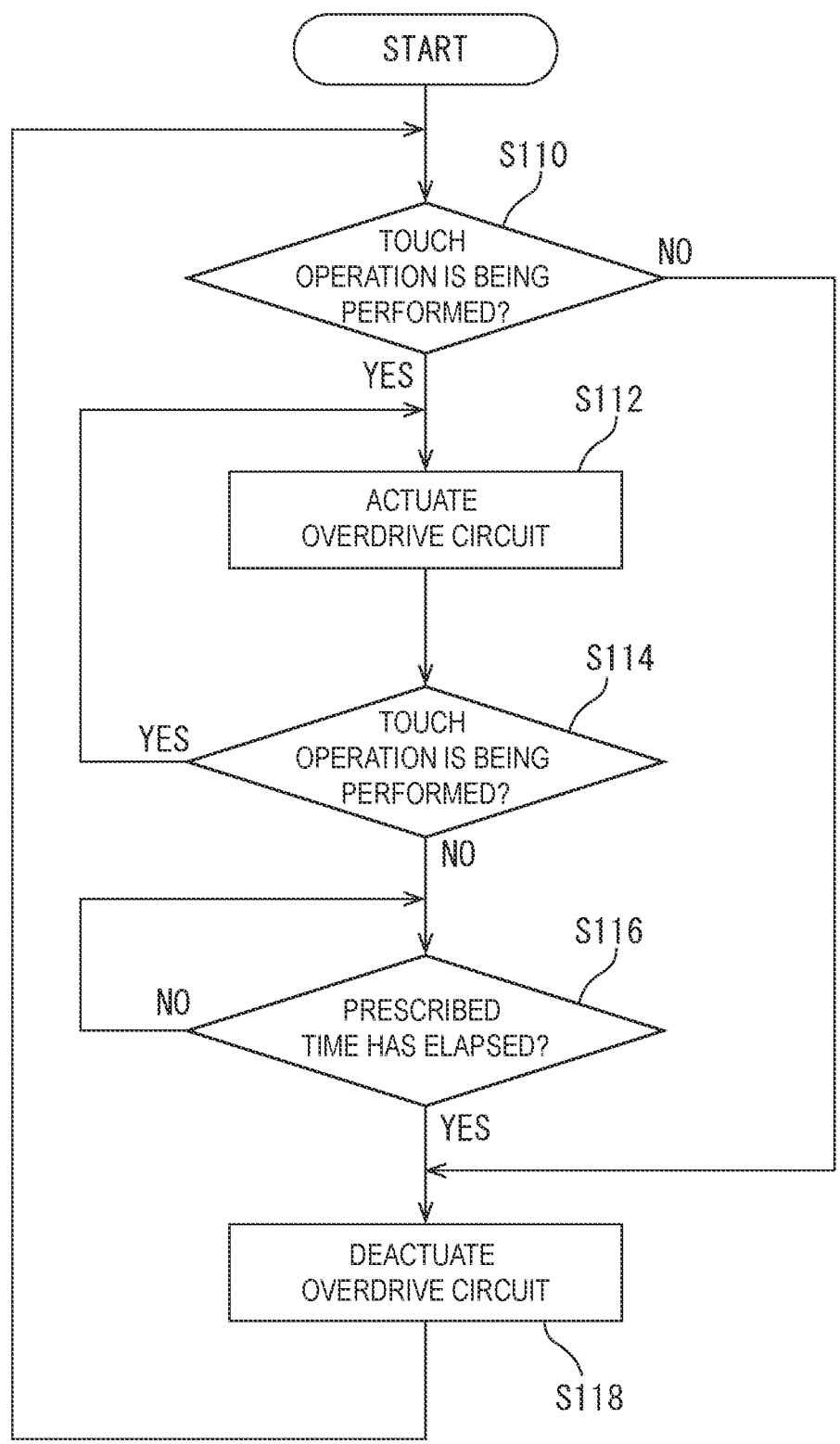
FIG. 9 is a flow chart representing control of an operation of an overdrive circuit in accordance with another embodiment.

A description is given of control of an operation of the overdrive circuit 71B in accordance with Embodiment 2 with reference to the flow chart in FIG. 9. Redundant description of structures, workings, and effects that are similar to those in Embodiment 1 is omitted in Embodiment 2.

As shown in the flow chart in FIG. 9, if the touch information from the TP controller 73 indicates that no touch operation is being performed (NO in S110), the overdrive circuit 71B is not actuated (S118). On the other hand, if the touch information from the TP controller 73 indicates that a touch operation is being performed (YES in S110), the overdrive circuit 71B is actuated (S112). The overdrive circuit 71B remains actuated while the touch operation is being performed (while the touch operation is being detected) (YES in S114, S112). Overdriving is performed on the gray level values across a plurality of display frames while the overdrive circuit 71B remains actuated. This arrangement enables the overdrive circuit 71B to remain actuated throughout a swipe or other touch operation, thereby more reliably improving display quality.

Additionally, following the touch information indicating that no touch operation is being performed after indicating that a touch operation is being performed (NO in S114), the overdrive circuit 71B remains actuated for a prescribed time (e.g., approximately from 2 seconds to 30 seconds) (NO in S116). When the prescribed time has elapsed (YES in S116), the overdrive circuit 71B is deactuated (S118). This arrangement enables actuating the overdrive circuit 71B even while the display screen is, for example, scrolling for the prescribed time in response to a flick in the absence of a touch operation, thereby more reliably improving display quality.

Embodiment 3

Figure 10:
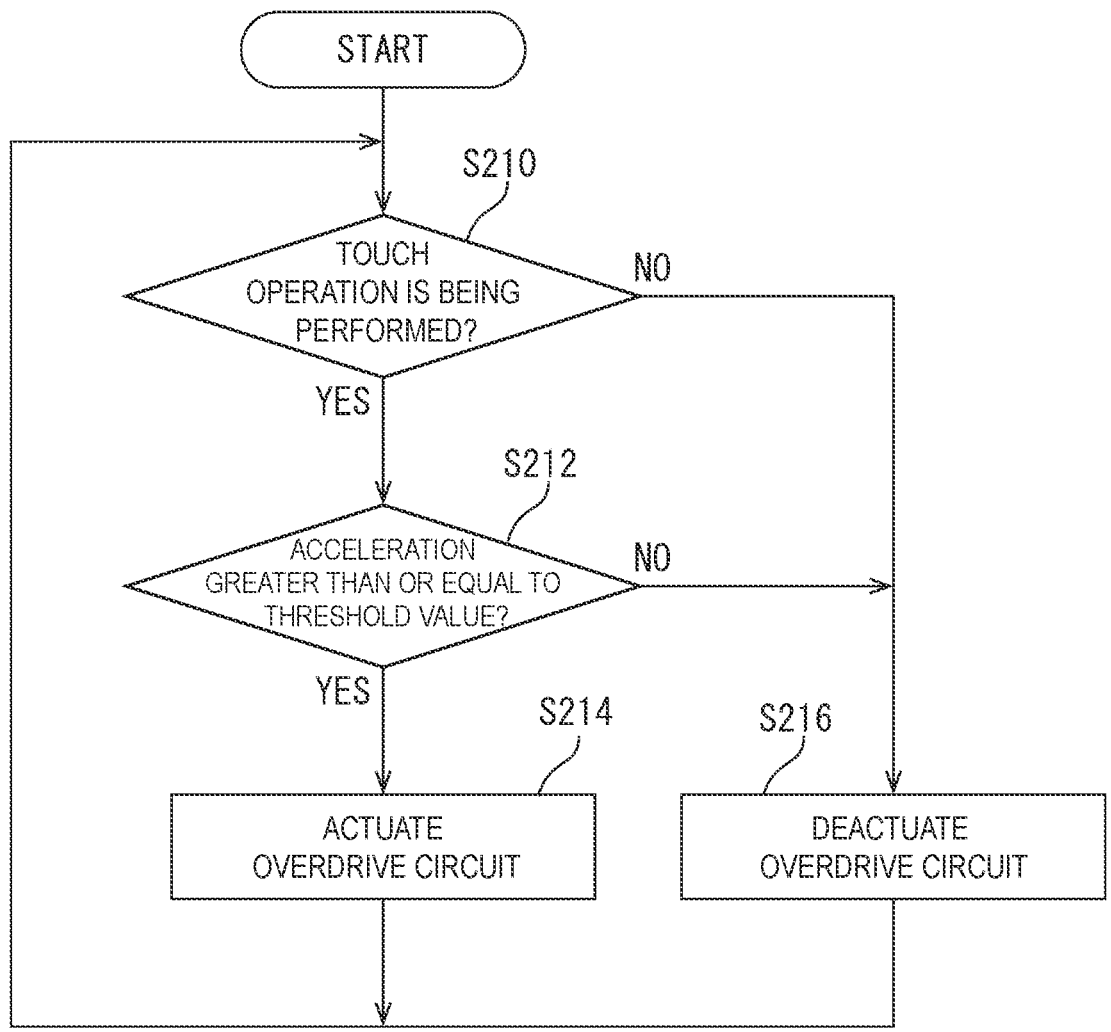
FIG. 10 is a flow chart representing control of an operation of an overdrive circuit in accordance with another embodiment.

A description is given of control of an operation of the overdrive circuit 71B in accordance with Embodiment 3 with reference to the flow chart in FIG. 10. Redundant description of structures, workings, and effects that are similar to those in Embodiment 1 is omitted in Embodiment 3.

As shown in the flow chart in FIG. 10, if the touch information from the TP controller 73 indicates that a touch operation is being performed (YES in S210) and also that the acceleration of the touch operation is greater than or equal to a prescribed threshold value (YES in S212), the overdrive circuit 71B is actuated (S214). On the other hand, if the touch information from the TP controller 73 indicates either that no touch operation is being performed (NO in S210) or that a touch operation is being performed (YES in S210), but the acceleration of the touch operation is less than the prescribed threshold value (NO in S212), the overdrive circuit 71B is not actuated (S216). This arrangement enables the overdrive circuit 71B to remain actuated while the display screen is being scrolling in response to a swipe or flick where the acceleration of the touch operation is greater than or equal to the prescribed threshold value, thereby more reliably improving display quality. Meanwhile, if the acceleration of the touch operation is less than the prescribed threshold value, the touch operation is assumed to be, for example, a tap or a text input, so that the display screen does not need to scroll. The overdrive circuit 71B is therefore not actuated, and increases in power consumption are more reliably restrained.

Other Embodiments

The disclosure is not necessarily limited to the foregoing description and embodiments described with reference to drawings. As an example, the following embodiments are also encompassed in the technical scope of the disclosure.

(1) The liquid crystal panel 10 may be imparted a touch panel function by any scheme other than the electrostatic capacity scheme, such as a resistive film scheme, an ultrasound scheme, and an optical scheme. When this is the case, the sensor unit is not necessarily the sensor electrodes 21 and may be constructed of a member(s) that is suited to the scheme by which the touch panel function is realized.

(2) The TCON 71 and the TP controller 73 may be mounted to the control board 70 by, for example, an SOF (system on film) technique. In addition, the control board 70 may be integrated with the flexible substrate 14.

(3) The subject technology is applicable also to display devices including a display panel including a medium layer of functional molecules other than liquid crystal molecules.

While there have been described what are at present considered to be certain embodiments of the disclosure, it will be understood that various modifications may be made thereto, and it is intended that the appended claim cover all such modifications as fall within the true spirit and scope of the disclosure.

What is claimed is:

1. A display device comprising:
   a display panel including:
      a display screen on which an image is displayed; and
      a sensor unit configured to detect a touch operation on the display screen;
   a first control unit configured to supply a first signal to the display panel to display the image; and
   a second control unit configured to calculate touch information related to the touch operation based on a sensor signal received from the sensor unit and to supply the touch information to the first control unit, wherein
   the first control unit includes:
      a signal generator configured to generate the first signal based on an image signal supplied by an external image signal supply source; and
      an overdrive circuit configured to perform a process of increasing an amplitude of the first signal generated by the signal generator,
   the overdrive circuit is actuated based on the touch information received from the second control unit,
   the first control unit, in response to the actuation of the overdrive circuit, supplies the first signal having the amplitude increased by the overdrive circuit to the display panel,
   the first control unit determines, based on the touch information received from the second control unit, whether the touch operation is being performed,
   the overdrive circuit is actuated in response to a determination that the touch operation is being performed, and
   the overdrive circuit remains actuated from a point of time at which the determination is made that the touch operation is being performed until a point of time at which a determination is made that no more touch operation is being performed.

2. The display device according to claim 1, wherein the overdrive circuit remains actuated for a prescribed time after the determination that no touch operation is being performed.

3. The display device according to claim 1, wherein
   the signal generator generates the first signal as discretized gray level values, and
   the overdrive circuit performs a process of increasing the discretized gray level values.

4. The display device according to claim 1, wherein the sensor unit is a sensor electrode configured to detect the sensor signal by an electrostatic capacity scheme.

5. The display device according to claim 1, wherein the display panel is a liquid crystal panel including a liquid crystal layer containing liquid crystal molecules that change alignment.

6. A method of driving a display device including a display panel having a touch panel function, the method comprising:
   generating, based on an image signal supplied by an external image signal supply source, a first signal to display an image;
   calculating touch information related to a touch operation based on a sensor signal supplied by a sensor unit that detects the touch operation on a display screen;
   determining, based on the touch information, whether the touch operation is being performed; and
   in response to a determination that the touch operation is being performed, actuating an overdrive circuit that performs a process of increasing an amplitude of a first signal and supplying the first signal having the amplitude increased by the overdrive circuit to the display panel,
   wherein the overdrive circuit remains actuated from a point of time at which the determination is made that the touch operation is being performed until a point of time at which a determination is made that no more touch operation is being performed.

7. The method according to claim 6, wherein the overdrive circuit remains actuated for a prescribed time after the determination that no touch operation is being performed.

8. The method according to claim 6, further comprising:
   generating the first signal as discretized gray level values, wherein
   the overdrive circuit performs a process of increasing the discretized gray level values.

9. The method according to claim 6, wherein the sensor unit is a sensor electrode that detects the sensor signal by an electrostatic capacity scheme.

10. The method according to claim 6, wherein the display panel is a liquid crystal panel including a liquid crystal layer containing liquid crystal molecules that change alignment.

* * * * *